Feb. 4, 1936.                R. W. LUCE                 2,029,929
                          CATADIOPTRIC UNIT
                         Filed Feb. 21, 1933

$R^1 = .292$ inches; $O^1$ on Axis.
$R^2 = .353$ inches; $O^2 .022''$ off Axis.
$R^3 = .494$ inches; $O^3 .113''$ off Axis.
Focal point F is .280'' behind plano surface.
Axial Separations.
$O^1$ to $O^2 = .062''$
$O^1$ to $O^2 = .175''$ Inventor:
Richard W. Luce,
By
Attorneys.

Patented Feb. 4, 1936

2,029,929

UNITED STATES PATENT OFFICE 2,029,929

CATADIOPTRIC UNIT

Richard W. Luce, Elizabeth, N. J., assignor to Eastman Kodak Company, Rochester, N. Y., a corporation of New York Application February 21, 1933, Serial No. 657,831

3 Claims. (Cl. 88—82)

This invention relates to autocollimating catadioptric units and particularly to lenses for use in such units. It is desirable that such units especially when used for highway reflecting signals shall correct at least partially for spherical aberration, that there shall be a controlled amount of aberration to obliterate color and that the divergency of the reflected beam shall be controlled so that it will be of maximum intensity, of nearly circular cross section and of sufficient divergence to give maximum utility under highway conditions.

It is also desirable that the surfaces of the lens have a high polish, i. e., be truly optical surfaces and that the lenses be easy to manufacture.

It has been proposed in co-pending application Serial No. 644,802 filed November 29, 1932 in the name of Charles W. Frederick and myself to attain some of these objects by making the lens with one surface aspherical to correct for spherical aberration and rendering a portion of this surface diffusive to compensate for chromatic aberration and to control the divergence and pattern of the returned beam. While a single lens element may be corrected for spherical aberration by forming it with a proper aspherical surface such a surface can be polished only with a flexible tool which does not give optical accuracy, or with a rigid tool moving in one direction only which generally results in a surface marred by lines or scratches.

It is an object of this invention to provide for use in reflecting units a lens possessing substantially all of the desirable properties of an aspherical lens and which may be polished by ordinary polishing methods, i. e., polished with a rigid tool which may be moved in more than one direction over the surface.

Figure 1:
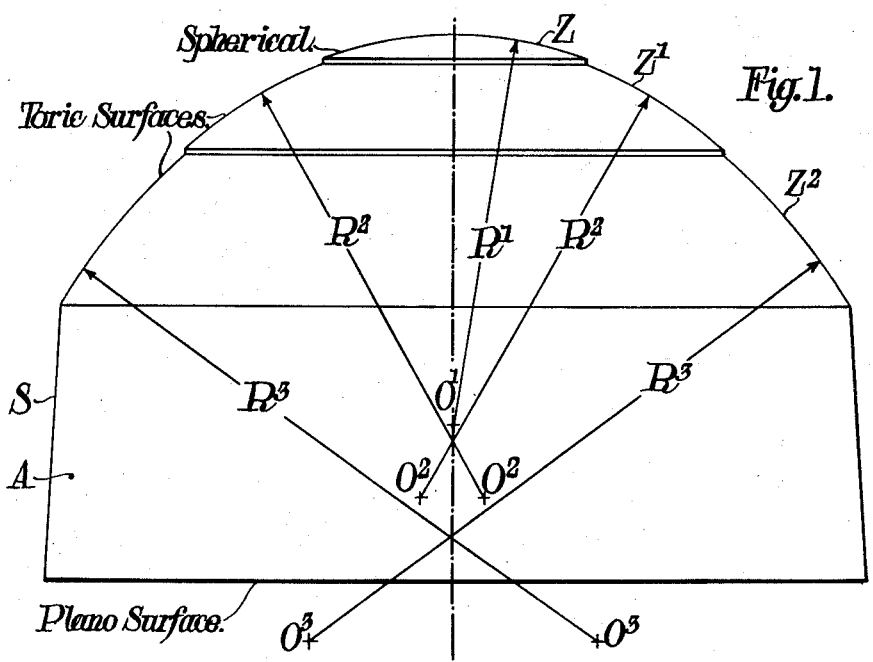
Figure 2:
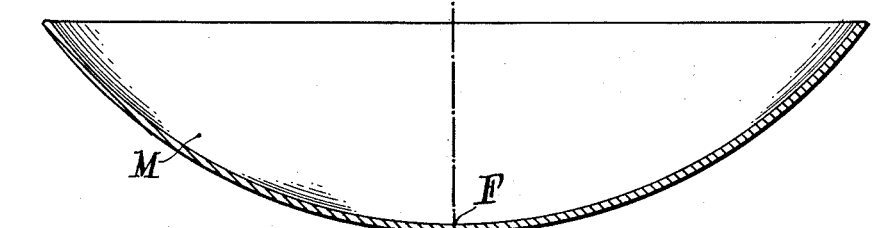
Figure 2:
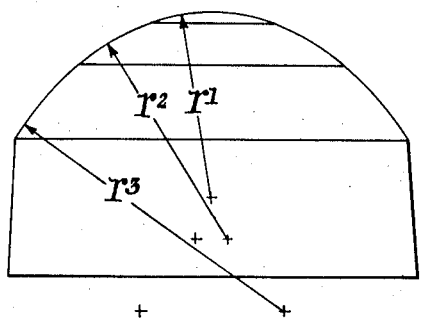

Other objects and advantages of my invention will become apparent from the following description taken in connection with the accompanying drawing in which Fig. 1 is a diagram showing on a large scale a reflecting unit including one form of the lens of my invention in elevation and a reflector in section; and Fig. 2 shows in elevation another form which my improved lens may take.

The lens shown in Fig. 1 consists of a single piece of glass A having a plane rear surface and a frusto-conical side S. The front surface of the lens consists of a central spherical zone Z and two coaxial annular toric zones $Z^1$ and $Z^2$ around the central zone Z. Each of the zones Z, $Z^1$ and $Z^2$ is uncorrected for spherical aberration but the average focal points of all of the zones are coincident at F which is accordingly the focus of the lens.

If it is assumed that the aberration introduced in axial rays due to the focusing of some of the rays in front of or behind the focal point F by a distance not greater than 0.5 mm. is insufficient to impair the desired optical characteristics set forth above, and experiment has shown that this assumption is sound, then the curvature of the several zones may be determined as follows:

In the case of the central zone a radius $R^1$ is found that will bring the narrow axial beam to a focus at a point not greater than 0.5 mm. beyond F, then rays parallel to the axis are triangulated through the lens at increasing distances from the axis until a point is reached where the ray falls short of the point F by not more than 0.5 mm. At this point the aspherical curve which will correct for spherical aberration is determined in a well known manner as by determining the slope of the curve at a number of points at increasing distances from the axis. The arc of a circle which will most closely approximate this curve is then determined and it will be found to have a radius $R^2$ and a center at $0^2$ which lies off the axis of the lens. The length of this arc is chosen such that a ray passing through any point thereof will cross the axis at a point not farther removed from the point F than 0.5 mm. Another arc having a radius $R^3$ and a center $0^3$ off the axis is chosen in a similar way and the process continued to the periphery of the lens. Thus F becomes the average focal point for all of the zones and in the embodiment illustrated in Fig. 1 I have found that only three zones are necessary to obtain satisfactory results. It is to be understood that after the circular arcs for the zones $Z^1$ and $Z^2$ have been determined they will be revolved about the axis of the lens to form the toric surfaces of the lens.

The dimensions hereafter given are in inches.

The lens illustrated in Fig. 1 may be made of ordinary crown glass having a refractive index for the O-line of 1.51. The total thickness of the lens is .427 and the width of the successive zones at their bases are respectively .200, .420 and .619 and the base of the button has a width of .649.

The radius of curvature of the central spherical zone is .292 with its center on the axis. The radii of the circular arcs used to form the toric zones $Z^1$ and $Z^2$ respectively are .353 and .494 and have their centers off the axis .022 and .113. Behind this lens at a point determined by the desired optical qualities of the units but preferably passing through the principal focal point F is a spherical reflector M. The point F is located .280 behind the plano surface of the lens.

In the unit as illustrated in Fig. 1 the lens surface is shown as having small offsets between the several zones. These offsets serve to increase slightly the thickness of the lens and do not collect any appreciable amount of dirt or dust. However, the lens may be formed with the adjacent zones contiguous as shown in Fig. 2 and when so formed results in a lens having a more pleasing appearance but its optical properties are the same as those of the lens shown in Fig. 1.

The distance from F at which the rays cross the axis is defined as spherical aberration. The amount of this aberration can best be determined by trial and error and the practical performance in the use of the button. The effect of this aberration is to spread the returning cone of light to a greater angular distance and thus make the button visible at points farther removed from the axis. This effect is in a similar way active for oblique rays as well as axial rays.

In oblique rays an astigmatic pattern is produced at the reflecting surface or focus of the button and accentuated on the return of the ray emerging again through the lens of the button. This adds somewhat to the spread of these rays. In the case of a series of zones as proposed for the front boundary of the present lens, or one of the boundaries, there is formed a series of astigmatic patterns differing in size and character in such a way as to obliterate any irregularity in these images due to this astigmatism and thus the button as seen obliquely will exhibit no selective brightness as the observer moves from the plane of the axial and oblique beam to points above or below this line or points immediately to the inside or outside of the oblique beams.

The aberrations as above indicated are determined for the average wave length of light in the visual spectrum, or yellow light. From the edge of a given zone, whence yellow light falls short of F, red light will fall nearer and thus return more accurately than yellow because the refracting power of glass is less for red. At the edge of the adjoining zone, where yellow light falls beyond F, blue light will fall nearer F, because the refractive power of glass is greater for blue light, thus bending it more. Thus at the dividing line of the two zones where the curvature changes the blue and red will occur in immediate proximity to one another and will be mixed and seen as substantially white light by an observer at a distance from the button. Thus prismatic colors or rainbow effects will be reduced in a sign composed of these buttons. This inherent compensation for chromatic aberration may be found to be insufficient due to the small number of zones and their close approximation to an aspherical surface in which case the outer of the two outer zones may be provided with a plurality of minute annular grooves to increase this color compensation as fully pointed out in the copending application of myself and Mr. Frederick, Serial Number 644,802.

From a practical standpoint a great advantage of the lens above described is that the surfaces can be polished by pitch polishing methods, that is, those standard in producing true optical surfaces which is not possible at present with an aspherical surface. This method involves the polishing of the surface with a rigid tool which is moved over the surface in at least two directions. An aspherical surface can be polished only with a flexible tool or with a rigid tool moving in one direction only at any point, neither of which is conducive to optical accuracy. While the individual lenses would be made by molds, the molds would be made with highly polished surfaces as fully described and claimed in my application Serial Number 657,832 filed concurrently herewith.

I contemplate as within my invention all modifications and equivalents which fall within the scope of the appended claims.

What I claim as new and desire to secure by Letters Patent of the United States, is:—

1. A lens for use in a catadioptric unit and having one plane surface and the other surface convex and divided into a series of coaxial zones, the center zone being a portion of a spherical surface, the outer zones being toric in contour and the average focal points of the several zones being coincident, whereby the total spherical aberration is less than that of an equivalent single spherical surface and a controlled amount of diffusion is introduced due to the differences in the signs of the spherical aberration of the adjacent portions of the successive zones.

2. A lens for use in a catadioptric unit consisting of a single piece of glass having a rear plane face and a front convex face, the convex face comprising a central spherical zone surrounded by two annular toric zones, all three zones having a common axis and a common focal point, the surfaces of the adjacent zones being in contact and constituting at their junctions a change in curvature which introduces a controlled amount of diffusion due to the differences in the signs of the spherical aberration of the adjacent portions of the successive zones.

3. A catadioptric unit comprising the combination of a single collecting lens and a reflector in the rear thereof and operative as an autocollimator, the lens having one surface substantially plano and its other surface consisting of a series of coaxial zones, the zones being surfaces of revolution formed by rotating arcs of circles about a common axis and the outer zones being toric in contour, the curvature of the successive zones outwardly from the axis being successively flatter so that their average focal points will coincide and the spherical aberration of the adjacent portions of successive zones being of opposite sign whereby a controlled amount of mixing of chromatically dispersed light is introduced into the system.

RICHARD W. LUCE.